US012728842B2

(12) United States Patent
Park et al.

(10) Patent No.: US 12,728,842 B2
(45) **Date of Patent: *Sep. 8, 2026**

(54) DEEP LEARNING-BASED COLLISION SAFETY CONTROL SYSTEM AND AN OPERATION METHOD THEREOF

(71) Applicants: HYUNDAI MOTOR COMPANY, Seoul (KR); KIA CORPORATION, Seoul (KR); Seoul National University R&DB Foundation, Seoul (KR)

(72) Inventors: Hyung Wook Park, Seoul (KR); Sung Roh Yoon, Seoul (KR); Dong Hyeok Lee, Seoul (KR)

(73) Assignees: HYUNDAI MOTOR COMPANY, Seoul (KR); KIA CORPORATION, Seoul (KR); Seoul National University R&DB Foundation, Seoul (KR)

( * ) Notice: Subject to any disclaimer, the term of this patent is extended or adjusted under 35 U.S.C. 154(b) by 167 days.

This patent is subject to a terminal disclaimer.

(21) Appl. No.: 18/377,443

(22) Filed: Oct. 6, 2023

(65) Prior Publication Data

US 2024/0116501 A1 Apr. 11, 2024

(30) Foreign Application Priority Data

Oct. 7, 2022 (KR) ........................ 10-2022-0128525

(51) Int. Cl.
*B60W 30/095* (2012.01)

(52) U.S. Cl.
CPC ....... *B60W 30/095* (2013.01); *B60W 2400/00* (2013.01)

(58) Field of Classification Search
None
See application file for complete search history.

(56) References Cited

U.S. PATENT DOCUMENTS

2018/0251092 A1* 9/2018 Lee ........................ G01S 15/931
2020/0010077 A1* 1/2020 Cormack ............ B60W 50/087
2021/0009121 A1* 1/2021 Oboril ............... B60W 30/0953
2022/0215288 A1* 7/2022 Ouyang ................. G06N 20/00
2022/0246035 A1* 8/2022 Garg ...................... G07C 5/008

FOREIGN PATENT DOCUMENTS

CN 109177971 A * 1/2019 ............ B60W 30/08

OTHER PUBLICATIONS

Automobile and server and its method of controlling security, control device and storage medium (Year: 2019).*

* cited by examiner

*Primary Examiner* — James M Mcpherson
*Assistant Examiner* — Bakari Underwood
(74) *Attorney, Agent, or Firm* — Lempia Summerfield Katz LLC

(57) ABSTRACT

A collision safety control system includes a memory storing a collision safety model having a deep learning-based collision safety control logic. The collision safety control system also includes a processor electrically connected to the memory. The processor is configured to, in accordance with the collision safety control logic, train, based on at least one signal including pre-collision data and post-collision data, the collision safety model such that the collision safety model outputs a collision type and a required time-to-fire (RTTF) of passenger protection equipment corresponding to the at least one signal.

15 Claims, 8 Drawing Sheets

120
FIRE DECISION MODULE
COLLISION TYPE CLASSIFICATION MODULE
FEATURE EXTRACTION NETWORK
RNN(LSTM)
230
240
220
210
205
207
203
201
Softmax
FC (2)
FC (5)
ReLU
Batch Norm
FC (10)
FC (128)
233
231
243
241
226
225
224
223
222
221

| SCEN No. | JC101-2 | JC101-3 |
| --- | --- | --- |
| | 50kph 42.7kph y x | 50kph 48.8kph y x |
| BASIC COLLISION TYPE | OFFSET COLLISION (OFF) | LEFT OBLIQUE COLLISION (LOB) |
| COLLISION RELATIVE SPEED | 45KPH | 56KPH |
| FINAL COLLISION TYPE | 40OFF | 60LOB |

501 521

DEEP LEARNING-BASED COLLISION SAFETY CONTROL SYSTEM AND AN OPERATION METHOD THEREOF

CROSS-REFERENCE TO RELATED APPLICATIONS

The present application claims the benefit of and priority to Korea Patent Application No. 10-2022-0128525, filed Oct. 7, 2022, the entire contents of which are hereby incorporated herein by reference.

TECHNICAL FIELD

The present disclosure relate to a deep learning-based collision safety control system and an operation method thereof.

BACKGROUND

Recently, an advanced driver assistance system (ADAS) is being developed so as to assist the driving of a driver. The ADAS has a plurality of lower technology categories and provides convenience to the driver. The ADAS is called autonomous driving or an automated driving system (ADS).

In order to protect passengers, a vehicle is equipped with passenger protection devices (or safety devices), such as an airbag and/or pre safe seat belt (PSB). The vehicle operates the passenger protection device when collision occurs. For example, a vehicle may detect collision with surrounding objects (e.g., other vehicles or pedestrians) during the autonomous driving, and may operate the passenger protection device in accordance with a collision safety control logic.

Typically, in order to operate the passenger protection device in accordance with the detected collision situation, parameters for the collision safety control logic are manually tuned based on actual vehicle tests and requirements. However, because there are so many parameters that must be considered during the actual vehicle test, there is a disadvantage that it takes a lot of time to tune the parameters.

SUMMARY

Various embodiments of the present disclosure provide a collision safety control system including a deep-learning based model capable of tuning parameters, and an operation method of the collision safety control system.

Various embodiments of the present disclosure provide a collision safety control system that trains a deep-learning based collision safety model by using pre-collision sensor data and post-collision sensor data in a vehicle, and an operation method of the collision safety control system.

The technical problems solved by the present disclosure are not limited to the above-mentioned technical problems. Other technical problems not mentioned can be clearly understood by a person having ordinary skill in the art from the following description.

According to an embodiment, a collision safety control system is provided. The collision safety control system includes a memory storing a collision safety model having a deep learning-based collision safety control logic. The collision safety control system also includes a processor electrically connected to the memory. The processor may be configured to, in accordance with the deep learning-based collision safety control logic, train, based on at least one signal including pre-collision data and post-collision data, the collision safety model such that the collision safety model outputs a collision type and a required time-to-fire (RTTF) or a time-to-fire (TTF) of passenger protection equipment corresponding to the at least one signal.

The pre-collision data may include at least one of an advanced driver assistance system (ADAS) signal of a forward collision-avoidance assist (FCA) level before an occurrence of a collision, a value of the FCA level before the occurrence of a collision, or a pre-collision relative approach speed before the occurrence of a collision.

The post-collision data may include a time series speed or a time series acceleration which is obtained by a plurality of collision detection sensors after an occurrence of a collision.

The processor may be configured to specify the post-collision data as an input data of the collision safety model. The processor may also be configured to specify the collision type and the RTTF as an output data of the collision safety model. The processor may further be configured to obtain a deep learning parameter of the collision safety model by performing first supervised learning of the collision safety model based on the input data and the output data. The post-collision data may include a first post-collision data which is obtained through an analysis and/or an actual vehicle test of each of the collision types defined in at least one of laws, merchantability, or sensing test items of a target vehicle. The collision type and the RTTF may be defined in at least one of the laws, the merchantability, or the sensing test items of the target vehicle.

The processor may be configured to determine, using the collision safety model to which the deep learning parameter has been applied, a collision type and a required time-to-fire of a second post-collision data obtained through an analysis of vehicle-to-vehicle collision.

The processor may be configured to specify a set of the pre-collision data and the post-collision data as the input data of the collision safety model to which the deep learning parameter has been applied. The processor may also be configured to specify the collision type and an adjusted RTTF as the output data of the collision safety model. The processor may be additionally configured to update the deep learning parameter of the collision safety model by performing second supervised learning of the collision safety model based on the input data and the output data. The post-collision data included in the set of the pre-collision data and the post-collision data may be the first post-collision data or the second post-collision data. The collision type may correspond to the first post-collision data or the second post-collision data. The adjusted RTTF may be obtained by adjusting the RTTF corresponding to the collision type based on the pre-collision data.

The processor may be configured to obtain the adjusted RTTF by applying a weight according to a forward collision-avoidance assist (FCA) level included in the pre-collision data to the RTTF corresponding to the collision type.

The processor may be configured to output, using the collision safety model to which the updated deep learning parameter has been applied, a collision type and a required time-to-fire of a random collision signal.

According to another embodiment, a method of operation of a collision safety control system is provided. The method may include obtaining at least one signal including pre-collision data and post-collision data. The method may also include training a collision safety model having a deep learning-based collision safety control logic such that the collision safety model outputs a collision type and a required time-to-fire (RTTF) or a time-to-fire (TTF) of passenger protection equipment corresponding to the at least one signal.

The pre-collision data may include at least one of an advanced driver assistance system (ADAS) signal of a forward collision-avoidance assist (FCA) level before an occurrence of a collision, a value of the pre-collision FCA level before the occurrence of a collision, or a pre-collision relative approach speed before the occurrence of a collision.

The post-collision data comprises a time series speed or a time series acceleration which is obtained by a plurality of collision detection sensors after an occurrence of a collision.

Training the collision safety model may include specifying the post-collision data as an input data of the collision safety model. Training the collision safety model may also include specifying the collision type and the RTTF as an output data of the collision safety model. Training the collision safety model may further include obtaining a deep learning parameter of the collision safety model by performing first supervised learning of the collision safety model based on the input data and the output data. The post-collision data may include a first post-collision data which is obtained through an analysis and/or an actual vehicle test of each of the collision types defined in at least one of laws, merchantability, or sensing test items of a target vehicle. The collision type and the RTTF may be defined in at least one of the laws, the merchantability, or the sensing test items of the target vehicle.

Training the collision safety model may further include determining, using the collision safety model to which the deep learning parameter has been applied, a collision type and a required time-to-fire of a second post-collision data obtained through an analysis of vehicle-to-vehicle collision.

Training the collision safety model may further include specifying a set of the pre-collision data and the post-collision data as the input data of the collision safety model to which the deep learning parameter has been applied. Training the collision safety model may also include specifying the collision type and an adjusted RTTF as the output data of the collision safety model. Training the collision safety model may further include updating the deep learning parameter of the collision safety model by performing second supervised learning of the collision safety model based on the input data and the output data. The post-collision data included in the set of the pre-collision data and the post-collision data may include at least one of the first post-collision data or the second post-collision data. The collision type may correspond to the first post-collision data or the second post-collision data. The adjusted RTTF may be obtained by adjusting the RTTF corresponding to the collision type based on the pre-collision data.

The adjusted RTTF may be obtained by applying a weight according to a forward collision-avoidance assist (FCA) level included in the pre-collision data to the RTTF corresponding to the collision type.

The method may further include outputting, using the collision safety model to which the updated deep learning parameter has been applied, a collision type and a required time-to-fire of a random collision signal.

BRIEF DESCRIPTION OF THE DRAWINGS

The above and other objects, features and advantages of the present disclosure should be more apparent from the following detailed description taken in conjunction with the accompanying drawings, in which.

DETAILED DESCRIPTION

Figure 1:
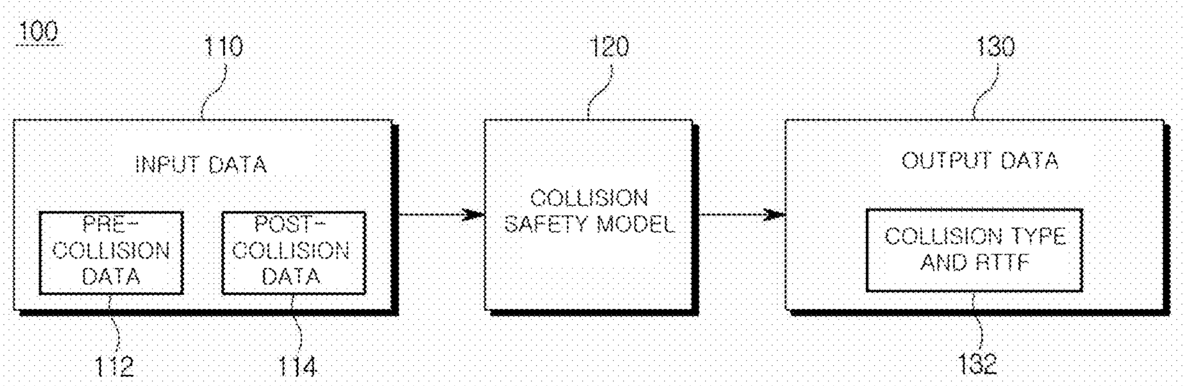
FIG. 1 is a block diagram of a deep learning-based collision safety control system, according to various embodiments of the present disclosure.

Hereinafter, embodiments of the present disclosure are described in detail with reference to the accompanying drawings, in which the same or similar components are given the same reference numerals, and redundant description thereof are omitted.

In the following description, terms "module" or "part" for referring to components are assigned and used interchangeably in consideration of only convenience for ease of explanation, and thus the terms do not have any distinguishing meaning or function per se. Also, the "module" or "part" may mean software components or hardware components such as a field programmable gate array (FPGA), an application specific integrated circuit (ASIC). The "part" or "module" performs certain functions. However, the "part" or "module" is not meant to be limited to software or hardware. The "part" or "module" may be configured to be placed in an addressable storage medium or to be loaded on one or more processors. Thus, for one example, the "part" or "module" may include components such as software components, object-oriented software components, class components, and task components, and may include processes, functions, attributes, procedures, subroutines, segments of a program code, drivers, firmware, microcode, circuits, data, databases, data structures, tables, arrays, and variables. Components and functions provided in the "part" or "module" may be combined into a smaller number of components and "parts" or "modules" or may be further divided into additional components and "parts" or "modules".

Methods or algorithm steps described relative to some embodiments of the present disclosure may be directly implemented by hardware and software modules that are executed by a processor or may be directly implemented by a combination thereof. The software module may be resident on a RAM, a flash memory, a ROM, an EPROM, an EEPROM, a resistor, a hard disk, a removable disk, a CD-ROM, or any other type of record medium known to those having ordinary skill in the art. A record medium may be coupled to a processor and the processor may read information from the record medium and may record the information in a storage medium. In another way, the record medium may be integrally formed with the processor. The processor and the record medium may be resident within an application specific integrated circuit (ASIC). The ASIC may be resident within a user's terminal.

In the following description, the detailed description of known technologies is omitted to avoid making the subject matter of the embodiment disclosed in the present specification unclear. Also, the accompanied drawings are provided only to illustrate various technical features. The technical spirit disclosed in the present specification is not limited by the accompanying drawings. All modification, equivalents and substitutes included in the spirit and scope of the present disclosure should be understood to be included in the accompanying drawings.

While terms including ordinal numbers such as the first and the second, etc., can be used to describe various components, the components are not limited by these terms. The terms are used only for distinguishing between one component and other components.

It should be understood that when an element is referred to as being "coupled" or "connected" to another element, it can be directly coupled or connected to the other element or intervening elements may be present therebetween. In contrast, it should be understood that when an element is referred to as being "directly coupled" or "directly connected" to another element, there are no intervening elements present.

When a component, device, element, or the like of the present disclosure is described as having a purpose or performing an operation, function, or the like, the component, device, or element should be considered herein as being "configured to" meet that purpose or perform that operation or function.

A vehicle in embodiments of the present disclosure may be a vehicle capable of autonomous driving having an automated driving system (ADS). For example, the vehicle may perform at least one of steering, acceleration, deceleration, lane change, and stopping by the ADS without a driver's manipulation. For example, the ADS may include at least one of a pedestrian detection and collision mitigation system (PDCMS), a lane change decision aid system (LCAS), a lane departure warning system (LDWS), an adaptive cruise control (ACC), a lane keeping assistance system (LKAS), a road boundary departure prevention system), a curve speed warning system (CSWS), a forward vehicle collision warning system (FVCWS), a low-speed following (LSF), and the like.

According to an embodiment, a collision safety control system 100 described below in the present disclosure may learn and/or be trained in a separate device for collision safety management of a vehicle, and then may be mounted on the vehicle.

FIG. 1 is a block diagram of the deep learning-based collision safety control system 100, according to various embodiments of the present disclosure.

Figure 2:
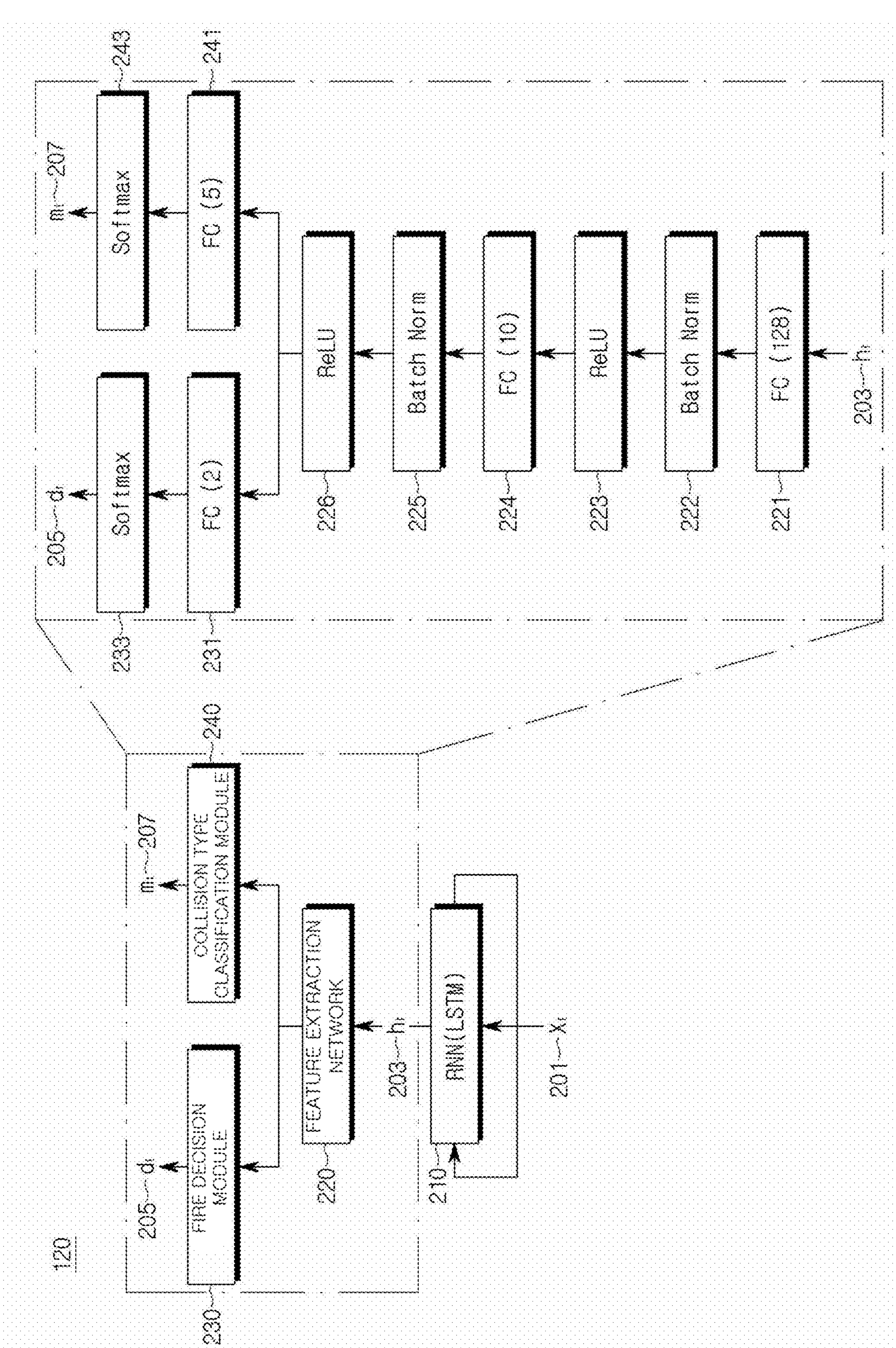
FIG. 2 shows a deep learning-based collision safety control logic, according to various embodiments of the present disclosure.
Figure 3:
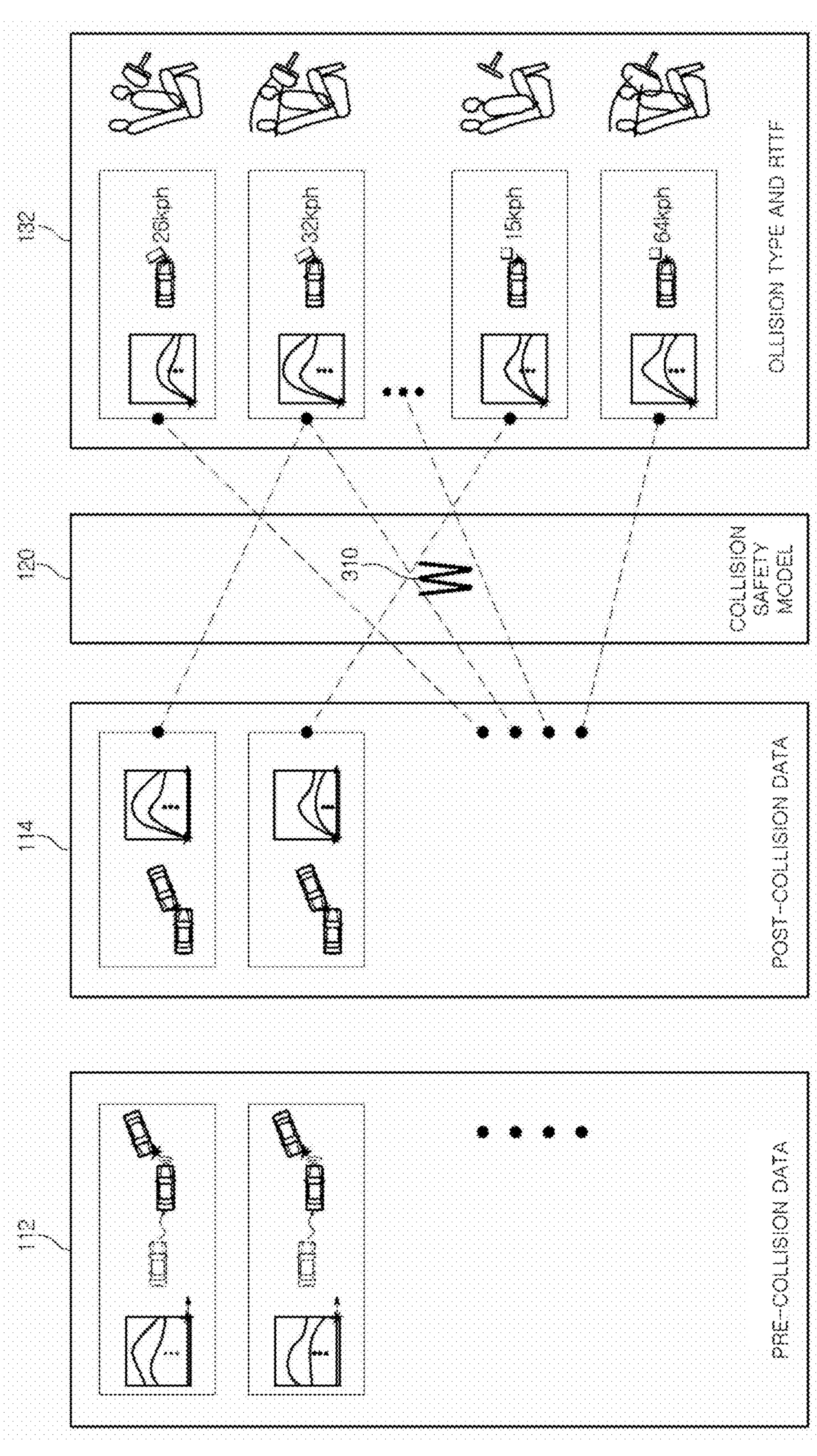
FIG. 3 shows an example of training a deep learning-based collision safety model, according to various embodiments of the present disclosure.
Figure 4:
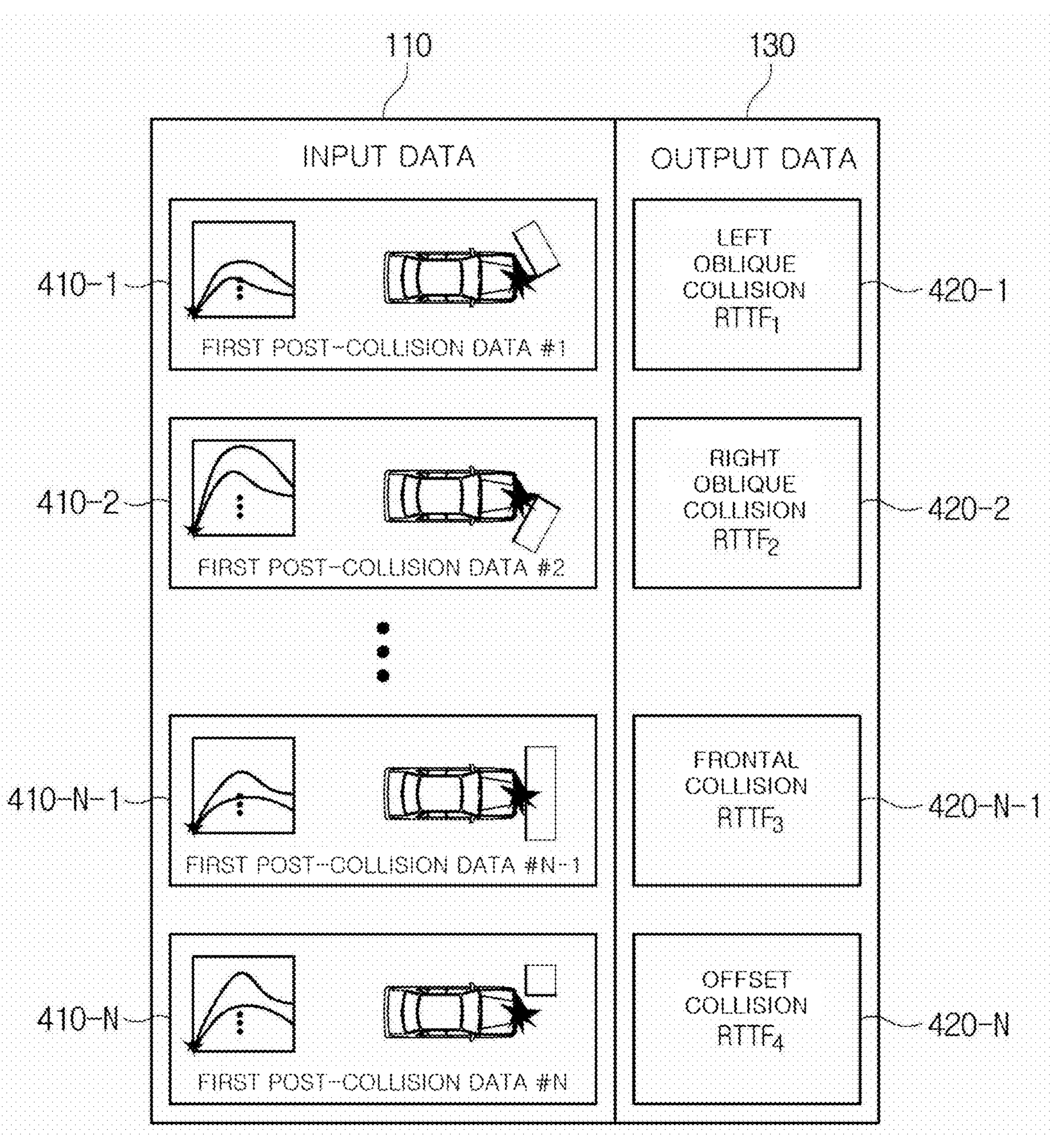
FIG. 4 shows examples of inputs and outputs for first supervised learning of the deep learning-based collision safety control model, according to various embodiments of the present disclosure.
Figures 5, 6:
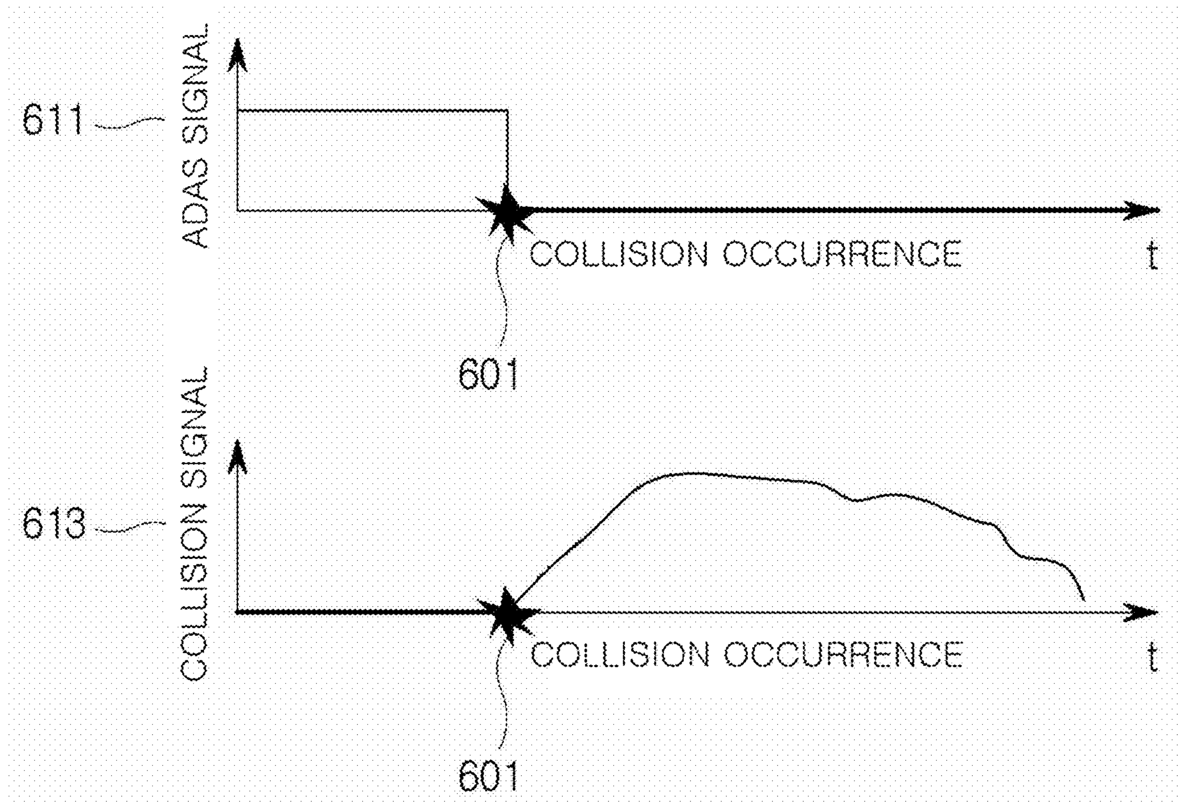
FIG. 5 shows an example of classifying collision types, according to various embodiments of the present disclosure.
FIG. 6 shows examples of pre-collision data and post-collision data, according to various embodiments of the present disclosure.
Figure 7:
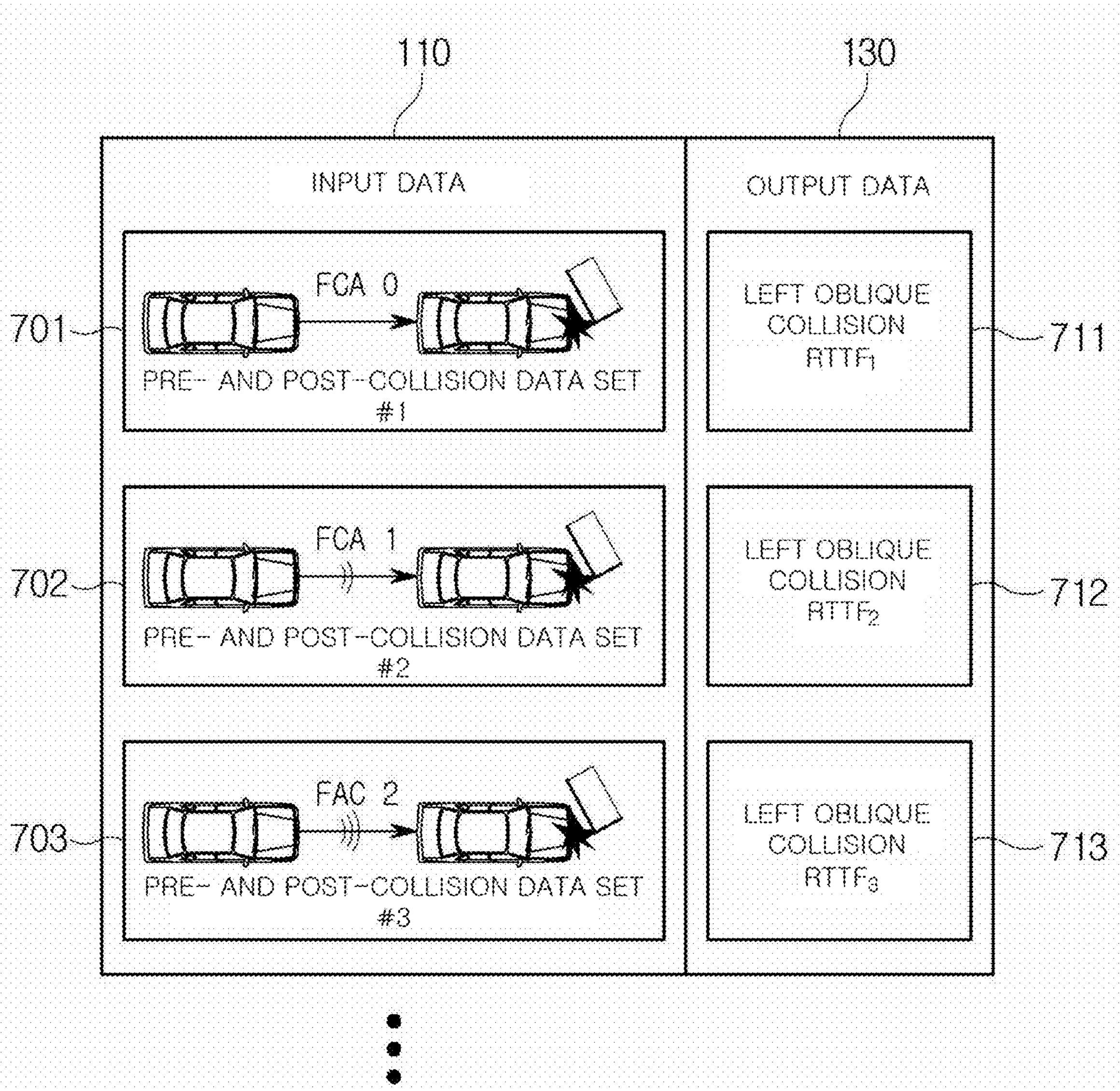
FIG. 7 shows examples of inputs and outputs for second supervised learning of the deep learning-based collision safety control model, according to various embodiments of the present disclosure.

A configuration of the deep learning-based collision safety control system 100 shown in FIG. 1 is an embodiment, and other components not shown may be added. According to an embodiment, a component shown in FIG. 1 may be configured with one chip, one part, or one electronic circuit or configured by combining chips, parts, and/or electronic circuits. According to an embodiment, some of the components shown in FIG. 1 may be divided into a plurality of components and may be configured with different chips, parts or electronic circuits. The components of FIG. 1 are described in more detail below with reference to FIGS. 2-7. FIG. 2 shows a deep learning-based collision safety control logic, according to various embodiments of the present disclosure. FIG. 3 is a diagram illustrating training a deep learning-based collision safety model, according to various embodiments of the present document. FIG. 4 shows examples of inputs and outputs for first supervised learning of the deep learning-based collision safety control model, according to various embodiments of the present disclosure. FIG. 5 shows an example of classifying collision, according to various embodiments of the present disclosure. FIG. 6 shows examples of pre-collision data and post-collision data, according to various embodiments of the present disclosure. FIG. 7 shows examples of inputs and outputs for second supervised learning of the deep learning-based collision safety control model, according to various embodiments of the present disclosure.

Referring to FIG. 1, the collision safety control system 100 may include a collision safety model 120.

According to various embodiments, the collision safety model 120 may output an output data 130 according to the deep learning-based collision safety control logic, on the basis of an input data 110.

The input data 110 may be a collision signal including pre-collision data 112 and/or post-collision data 114. The pre-collision data 112 and/or post-collision data 114 may be obtained from a plurality of collision detection sensors provided at different positions of the vehicle or a moving deformable barrier (MDB). For example, the pre-collision data 112 may include data obtained from the plurality of collision detection sensors before the collision occurs, and the post-collision data 114 may include data obtained from the plurality of collision detection sensors from a point of time when the collision occurs.

The output data 130 may include a collision type of the input data 100 and a required time-to-fire (RTTF) or a time-to-fire (TTF) of passenger protection equipment. In the following description, the RTTF may mean the TTF. According to the embodiment, an output type may include a probability value of each of a plurality of specified collision types. For example, when the plurality of specified collision types includes frontal collision, left oblique collision, right oblique collision, and offset collision, the collision type may include a probability that the input data 110 is the frontal collision, a probability that the input data 110 is the left-angled collision, a probability that the input data 110 is the right oblique collision, and a probability that the input data 110 is the offset collision. According to an embodiment, the plurality of specified collision types may be set by a business operator and/or an administrator of the collision safety control system 100 on the basis of at least one of a collision portion, a collision direction, a collision strength, and/or a relative speed. Accordingly, each of the plurality of collision types may represent at least one of a collision portion, a collision direction, a collision strength, and/or a relative speed with another object. The RTTF of the passenger protection equipment may vary according to the collision types.

According to an embodiment, the collision safety control logic of the collision safety model 120 may be configured as shown in FIG. 2. For example, the collision safety model 120 includes a long short-term memory (LSTM) or a recurrent neural network (RNN) 210 that outputs a hidden state signal $h_t$ 203, on the basis of an input data $X_t$ 201. The RNN 210 may include an input layer, an output layer, and one or more hidden layers. The RNN 210 may have a recurrent structure therein, so that it has a structure in which the learning of the past time is multiplied by a weight and may be reflected in the current learning and the current output result may be affected by the output result from the past time. The hidden layer of the RNN 210 performs a kind of memory function. Therefore, it can be effective in classifying or predicting by learning sequential data. According to an embodiment, the LSTM is a neural network that solves a problem that past old data of the RNN 210 disappears without influence. As with the RNN 210, the LSTM is effective in classifying or predicting by learning sequential data.

According to an embodiment, the collision safety control logic of the collision safety model 120 may further include a feature extraction network 220, a fire decision module 230, and a collision type classification module 240.

The feature extraction network 220 may map the hidden state signal $h_t$ 203 to a feature space (or an embedding space), in order to obtain a meaningful result from the hidden state signal $h_t$ 203 of the RNN 210 (e.g., whether to fire the passenger protection equipment and/or the required time-to-fire, and collision types).

According to an embodiment, the feature extraction network 220 may include a fully connected layers (FC layer) 221 and 224, a batch normalization layers (Batch Norm layer) 222 and 225, and a rectified linear unit (ReLU) layers 223 and 226.

The FC layers 221 and 224 may flatten the output of a previous layer and may convert it into a multidimensional vector that can be an input of the next stage. For example, the FC (128) layer 221 may transform the hidden state signal $h_t$ 221 into a 128-dimensional vector, and the FC (10) layer 224 may transform an output signal from the ReLU layer 223 into a 10-dimensional vector. The FC layers 221 and 224 have been described as the FC (128) and the FC (10). However, this is merely an example and various embodiments of the present disclosure are not limited thereto.

The batch normalization layers 222 and 225 may normalize such that the data distribution of each layer has a mean of 0 and a variance of 1. The batch normalization layers 222 and 225 can improve a learning rate by preventing the output value of a multi-layer network from diverging or disappearing.

The ReLU layers 222 and 226 are activation functions that impart non-linearity to the multi-layer network. When the input value is a negative number, the ReLU layers may be deactivated and output zero. On the other hand, when the input value is a positive number, the ReLU layers may be activated and output the corresponding value as it is. When the non-linearity is not imparted, even though there are multiple hidden layers, it is possible to transform them into an equivalent single layer, so that the learning objective is difficult to achieve. Accordingly, the activation function mentioned above may be applied to impart the non-linearity.

According to an embodiment, the fire decision module 230 may include an FC (2) layer 231 and a softmax layer 233, and the collision type classification module 240 may include an FC (5) layer 241 and a softmax layer 243. Each of the FC (2) layer 231 and the FC (5) layer 241 may flatten the output of the previous layer and may convert it into a multidimensional vector that can be an input of the next stage. Each of the softmax layers 233 and 243 may include a function used for softmax regression that is a generalized version of logistic regression, and may convert the output of the FC layer into a probability value between 0 and 1 for each classification type. Each of the fire decision module 230 and the collision type classification module 240 may determine a classification value having the greatest probability value as a final result among probability values for each classification type of the corresponding softmax layers 233 and 243.

For example, so as to determine whether to fire the passenger protection equipment and/or the required time-to-fire, the FC (2) layer 231 may transform the result signal output from the ReLU layer 226 into a two-dimensional vector, and the softmax layer 233 may normalize the transformed two-dimensional vector and may determine whether to operate the passenger protection equipment. So as to determine the collision type, the FC (5) layer 241 may transform the result signal output from the ReLU layer 226 into a five-dimensional vector, and the softmax layer 243 may normalize the transformed five-dimensional vector and may determine a probability value of each of five specified types. The five specified collision types may include, for example, frontal collision, left oblique collision, right oblique collision, offset collision, and a small overlap collision.

Although the case in which the fire decision module 230 and the collision type classification module 240 each include the FC (2) layer 231 and the FC (5) layer 241 has been described, this is only an example. Various embodiments of the present disclosure are not limited thereto. For example, the collision type classification module 240 may include an FC (m) layer based on the number (m) of a plurality of specified collision types.

As described above, the collision safety model 120 includes, as shown in FIG. 2, the collision safety control logic, thereby outputting the output data 130 which includes a first output signal $d_t$ 205 indicating whether to fire the passenger protection equipment and/or the required time-to-fire and a second output signal $m_t$ 207 indicating the collision type, on the basis of collision signals $X_t$ 201 and 110 provided from the collision detection sensors provided in the vehicle.

According to an embodiment, the collision signals $X_t$ 201 and 110 provided from the collision detection sensors may mean a signal value and/or a physical quantity vector obtained from the plurality of collision detection sensors at a point of time "t". For example, the collision signals $X_t$ 201 and 110 provided from the collision detection sensors may include 12 time series signals (e.g., six time series speed signals and six time series acceleration signals) obtained from six collision detection sensors. As another example, the collision signals $X_t$ 201 and 110 provided from the collision detection sensors may include 14 time series signals. The 14 time series signals may include, for example, 12 time series signals obtained from the six collision detection sensors, a signal representing a time series speed of another vehicle, and a signal representing a time series state value of autonomous emergency braking (AEB).

On the basis of the collision signals $X_t$ 201 and 110, the collision safety model 120 may output the first output signal $d_t$ 205 indicating whether to fire the passenger protection equipment and/or the required time-to-fire through the collision safety control logic shown in FIG. 2. On the basis of the collision signals $X_t$ 201 and 110, the collision safety model 120 may output the second output signal $m_t$ 207 indicating the collision type through the collision safety control logic shown in FIG. 2. The second output signal $m_t$ 207 indicating a collision type determination result may indicate a relative probability of each of predefined collision types. For example, the second output signal $m_t$ 207 may indicate a probability that the detected collision is the frontal collision is 90%, a probability that the detected collision is the right oblique collision is 5%, a probability that the detected collision is the left oblique collision is 5%, a probability that the detected collision is the offset collision is 0%, and a probability that the detected collision is the small overlap collision is 0%. In this case, the collision safety model 120 may determine the collision type as the frontal collision.

The collision safety model 120 classifies the collision types because a method to fire (or method to operate) the passenger protection equipment according to the collision type may be different even though the TTF (or time to operate) the passenger protection equipment according to the collision signal is the same. For example, because the passenger protection equipment that has to operate in the case of the frontal collision and the passenger protection equipment that has to operate in the case of the right oblique collision may be different from each other, the collision safety model 120 must determine the collision type simultaneously with the time to operate the passenger protection equipment.

According to various embodiments, as shown in FIG. 3, the collision safety control system 100 performs the supervised learning of the collision safety model 120 on the basis of the pre-collision data 112 and/or the post-collision data 114, the collision type and RTTF 132, thereby obtaining a deep learning parameter "W" 310 of the collision safety model 120. For example, the deep learning parameter "W" 310 of the collision safety model 120 may be obtained by the supervised learning using the pre-collision data 112 and/or the post-collision data 114, the collision type and RTTF 132.

According to an embodiment, the collision safety control system 100 performs the first supervised learning of the collision safety model 120 on the basis of a first post-collision data, the collision type and RTTF corresponding to the first post-collision data, thereby obtaining the deep learning parameter "W" 310. The first post-collision data for the first supervised learning may include the post-collision data obtained through an analysis and/or an actual vehicle test of the collision types specified in at least one of laws, merchantability, or sensing test items of a target vehicle. According to an embodiment, the post-collision data obtained through an analysis and/or an actual vehicle test may include a signal amplitude distribution obtained through an analysis and/or an actual vehicle test of each of the specified collision types. The signal amplitude distribution may include a basic collision signal obtained through an analysis and/or an actual vehicle test of each of the specified collision types. The signal amplitude distribution may include signals obtained by increasing and decreasing the amplitude of the basic collision signal in accordance with a specified magnification. For example, the post-collision data may be obtained by using software such as LS-Dyna. In order to obtain the amount of the first post-collision data for the first supervised learning, additional data for learning may be generated by changing the signal amplitude distribution obtained through an analysis and/or an actual vehicle test.

According to an embodiment, the collision safety control system 100 specifies the input data of the collision safety model 120 as the first post-collision data and specifies in advance the output data of the collision safety model 120 as the collision type and RTTF corresponding to the first post-collision data, so that the first supervised learning of the collision safety model 120 can be performed. In an embodiment, because the first post-collision data is obtained through an analysis and/or an actual vehicle test of the collision types defined in at least one of laws, merchantability, or sensing test items of a target vehicle, the collision type corresponding to each first post-collision data may be determined in advance. In addition, because the collision type corresponding to the first post-collision data is determined in advance, the RTTF corresponding to the first post-collision data can be checked by the RTTF for each of the collision types defined in at least one of laws, merchantability, or sensing test items of a target vehicle.

Accordingly, as shown in FIG. 4, the collision safety control system 100 may specify the output data 130 for the first post-collision data #1 410-1 that is the input data 110 as the left oblique collision and $RTTF_1$ 420-1, and may specify the output data 130 for the first post-collision data #2 410-2 that is the input data 110 as the right oblique collision and $RTTF_2$ 420-2. In addition, the collision safety control system 100 may specify the output data 130 for the first post-collision data #N−1 410-N−1 that is the input data 110 as the frontal collision and $RTTF_3$ 420-N−1, and may specify the output data 130 for the first post-collision data #N 410-N that is the input data 110 as the offset collision and $RTTF_4$ 420-N. For example, as shown in FIG. 4, the collision safety control system 100 performs the first supervised learning of the collision safety model 120 on the basis of the specified input data 110 and output data 130, thereby obtaining the deep learning parameter "W" 310 of the collision safety model 120.

According to the embodiments, various collision types which can occur using vehicle-to-vehicle or MDB may be classified and/or specified into a plurality of collision types (e.g., approximately 30) on the basis of a collision direction, a collision portion, a collision strength, and/or a collision relative speed. For example, the plurality of specified collision types may be classified as 40 kph frontal collision when the collision direction and collision portion correspond to the frontal collision and the collision relative speed is 31 kph to 50 kph. The plurality of specified collision types may be classified as 60 kph frontal collision when the collision direction and a collision angle correspond to the frontal collision and the collision relative speed is 51 kph to 70 kph. The plurality of specified collision types may be classified as 60 kph left oblique collision 60LOB when the collision direction and angle correspond to the left oblique collision and the collision relative speed is 51 kph to 80 kph. As an example, as shown in FIG. 5, when a basic collision type 501 which is classified according to the collision direction and angle is the offset collision OFF and the collision relative speed is 45 kph, a final collision type may be determined as 40OFF 501. Also, when a basic collision type 501 which is classified according to the collision direction and angle is the left oblique collision LOB and the collision relative speed is 56 kph, the final collision type may be determined as 60LOB 521. The classification of the collision type described above may vary depending on a business operator and/or laws, merchantability, and sensing test items.

According to various embodiments, the collision safety control system 100 may determine the collision type and RTTF of a second post-collision data by using the collision safety model 120 that has completed the first supervised learning. The collision safety model 120 that has completed the first supervised learning may mean the collision safety model 120 to which the deep learning parameter "W" 310 obtained by the first supervised learning is applied. The second post-collision data is obtained through the analysis of vehicle-to-vehicle collision (or MDB collision), and may include a plurality of signal amplitude distributions in which a corresponding collision type is not determined. For example, through the collision safety model 120 to which the deep learning parameter "W" 310 is applied, the collision safety control system 100 may determine which of the approximately 30 collision types each of the plurality of signal amplitude distributions corresponds to.

According to various embodiments, the collision safety control system 100 performs the second supervised learning of the collision safety model 120 on the basis of a pre- and post-collision data set, the collision type and the RTTF corresponding to the pre- and post-collision data set, thereby updating the deep learning parameter "W" 310.

According to an embodiment, the pre- and post-collision data set used in the second supervised learning may include the pre-collision data 112 and the post-collision data 114. The pre-collision data 112 may include data obtained from the plurality of collision detection sensors before the collision occurs. For example, the pre-collision data 112 may include an advanced driver assistance system (ADAS) signal. The ADAS signal may include at least one of a pre-collision forward collision-avoidance assist (FCA) level and a pre-collision relative approach speed. The post-collision data 114 may include the first post-collision data and/or the second post-collision data.

According to an embodiment, as shown in FIG. 6, the pre- and post-collision data set used in the second supervised learning may include an ADAS signal 611 before and after the collision occurrence 601 and may include a collision signal 613 before and after the collision occurrence 601. The ADAS signal 611 before the collision occurrence 601 may indicate a value of the FCA level, and/or the relative approach speed. The ADAS signal 611 after the collision occurrence 601 may be set to zero. The collision signal 613 before the collision occurrence 601 may be set to zero. The collision signal 613 after the collision occurrence 601 may indicate data obtained from the plurality of collision detection sensors.

According to an embodiment, the collision type used in the second supervised learning may be set to a collision type corresponding to the post-collision data included in the pre- and post-collision data set. The collision type corresponding to the post-collision data may be obtained by inputting the post-collision data to the collision safety model 120 which has completed the first supervised learning.

According to an embodiment, the RTTF used in the second supervised learning may be set to a value obtained by adjusting, on the basis of the pre-collision data, the RTTF corresponding to the post-collision data included in the pre- and post-collision data set. The RTTF corresponding to the post-collision data may be obtained by inputting the post-collision data to the collision safety model 120 that has completed the first supervised learning. For example, the RTTF used in the second supervised learning may be set to the RTTF obtained by applying a weight according to the pre-collision data to the RTTF corresponding to the post-collision data.

For example, as shown in FIG. 7, when the FCA level of the pre-collision data included in the pre- and post-collision data set #1 701 is zero, the collision type may be set to the left oblique collision corresponding to the post-collision data, and the RTTF may be set to a value of $RTTF_1$ 711 obtained by applying a first weight to the RTTF of the left oblique collision. As another example, when the FCA level of the pre-collision data included in the pre- and post-collision data set #2 702 is 1, the collision type may be set to the left oblique collision corresponding to the post-collision data, and the RTTF may be set to a value of $RTTF_2$ 713 obtained by applying a second weight to the RTTF of the left oblique collision. As yet another example, when the FCA level of the pre-collision data included in the pre- and post-collision data set #3 703 is 2, the collision type may be set to the left oblique collision corresponding to the post-collision data, and the RTTF may be set to a value of $RTTF_3$ 713 obtained by applying a third weight to the RTTF of the left oblique collision. The weight may be applied to the RTTF on the basis of the pre-collision data. For example, when the posture of the passenger is inclined due to the operation of the FCA, the passenger protection equipment has to be fired more quickly. Accordingly, the RTTF of the passenger protection equipment can be earlier on the basis of the pre-collision data.

As shown in FIG. 7, the collision safety control system 100 performs the second supervised learning of the collision safety model 120 on the basis of the specified input data 110 and output data 130, thereby updating the deep learning parameter "W" 310.

According to various embodiments, the collision safety control system 100 may obtain the collision type and the RTTF of the pre- and post-collision data set obtained in a random collision situation through the collision safety model 120 which has completed the second supervised learning.

Figure 8:
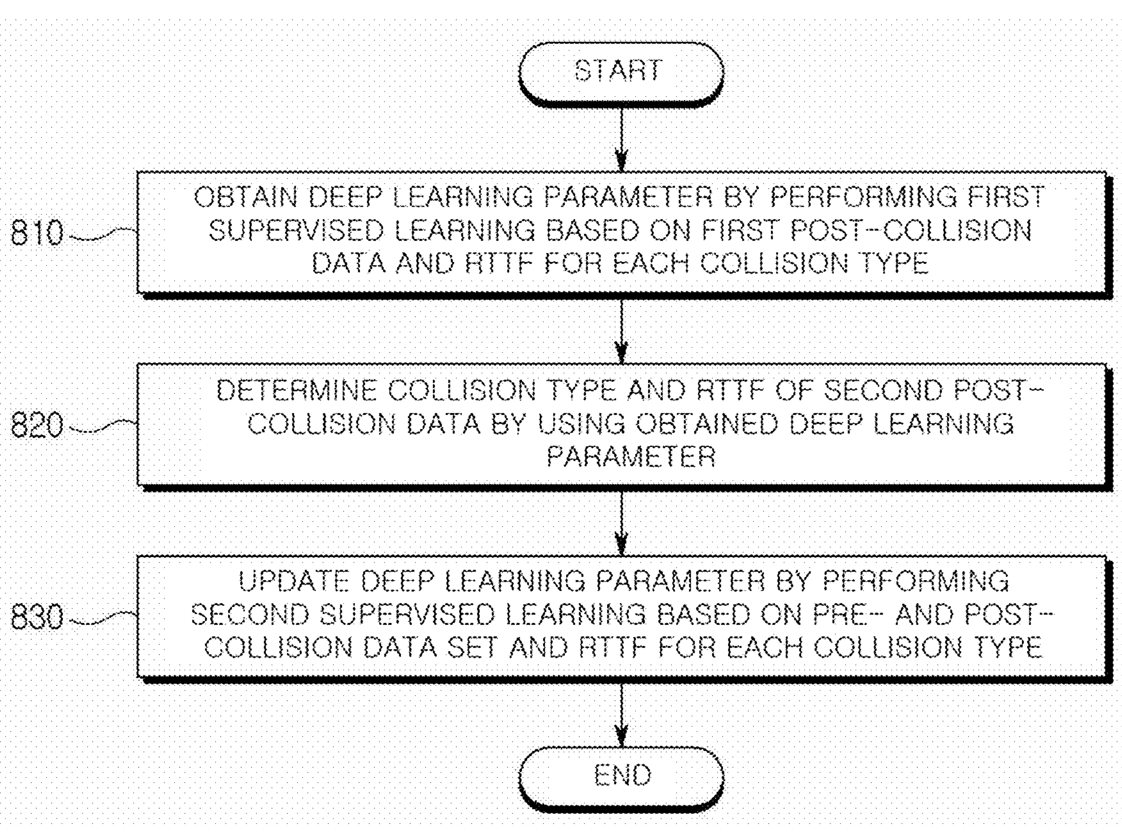
FIG. 8 is a flowchart showing that training of the deep learning-based collision safety model, according to various embodiments of the present disclosure is performed.

FIG. 8 is a flowchart showing that training of the deep learning-based collision safety model, according to various embodiments of the present disclosure is performed.

Referring to FIG. 8, in a step or operation 810, the collision safety control system 100 performs the first supervised learning of the collision safety model 120 on the basis of the first post-collision data and the RTTF for each collision type, thereby obtaining the deep learning parameter "W". For example, the collision safety control system 100 may set the first post-collision data which is obtained through an analysis and/or an actual vehicle test of each of the collision types defined in at least one of laws, merchantability, or sensing test items of a target vehicle as the input data 110 of the collision safety model 120. The collision safety control system 100 may set a pre-known collision type of the first post-collision data and the RTTF of the collision type as the output data 130 of the collision safety model 120. The collision safety model 120 of the collision safety control system 100 may perform, as shown in FIG. 4, the first supervised learning on the basis of the set input data 110 and the set output data 130, thereby obtaining the deep learning parameter "W".

In a step or operation 820, the collision safety control system 100 may determine the collision type and RTTF of the second post-collision data by using the collision safety model 120 to which the obtained deep learning parameter is applied. The collision safety control system 100 may set the second post-collision data devoid of information on the collision type as input data of the collision safety model 120 to which the deep learning parameter "W" is applied. The second post-collision data may include a plurality of signal amplitude distributions obtained through the analysis of the vehicle-to-vehicle collision (or MDB collision). The collision safety model 120 of the collision safety control system 100 may output the collision type and RTTF corresponding to the input data by using the deep learning parameter obtained in step 810. The collision safety control system 100 may label the collision type and RTTF output from the collision safety model 120 as the collision type and RTTF of the second post-collision data.

In a step or operation 830, the deep learning parameter may be updated by performing the second supervised learning on the basis of the pre- and post-collision data set, the collision type, and RTTF. For example, the collision safety control system 100 may set, as shown in FIG. 6, a pre- and post-collision ADAS signal 611 and a pre- and post-collision collision signal 613 as the input data of the collision safety model 120. The collision safety control system 100 may determine the collision type on the basis of the post-collision data among the pre- and post-collision data set and may adjust the RTTF corresponding to the determined collision type on the basis of the pre-collision data. For example, the collision safety control system 100 may obtain an adjusted RTTF by applying a weight according to the value of the FCA level indicated by the pre-collision ADAS signal to the RTTF corresponding to the determined collision type. The collision safety control system 100 may set the determined collision type and the adjusted RTTF as the output data 130 of the collision safety model 120. The collision safety model 120 of the collision safety control system 100 may perform, as shown in FIG. 7, the second supervised learning on the basis of the set input data 110 and the set output data 130, thereby updating (or automatically tuning) the deep learning parameter "W".

Figure 9:
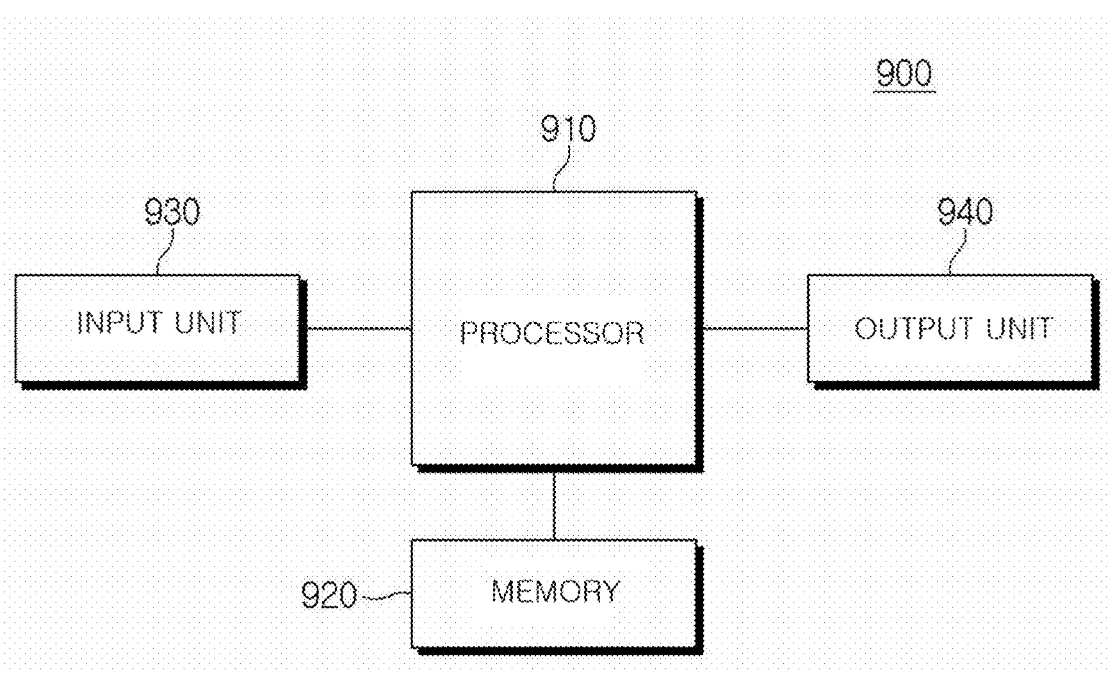
FIG. 9 is a block diagram of an electronic device performing the training of the deep learning-based collision safety model, according to various embodiments of the present disclosure.

FIG. 9 is a block diagram of an electronic device performing the training of the deep learning-based collision safety model, according to various embodiments of the present disclosure.

Referring to FIG. 9, an electronic device 900 that performs supervised learning of the deep learning-based collision safety model may include a processor 910, a memory 920, an input unit 930, and an output unit 940. The electronic device may include, for example, at least one of a robot device, a portable communication device, a portable multimedia device, a computer device, or a server device.

Each component of the electronic device 900 shown in FIG. 9 may be configured with one chip, one part, or one electronic circuit or configured by combining chips, parts, or electronic circuits. According to another embodiment, some of the components shown in FIG. 9 may be divided into a plurality of components (e.g., a plurality of processors) and may be configured as different chips, parts or electronic circuits. Also, some components are combined to form one chip, one part, or one electronic circuit.

According to various embodiments, the memory 920 may store data supporting various functions of the electronic device 900. The memory 920 may store program codes for the operation of the electronic device 900, for example, a program code in which the deep learning-based collision safety model 120 is implemented. The memory 920 may store data required for the electronic device 900 to train the collision safety model 120 or for the collision safety model 120 to learn, data generated during the training or learning process, and the deep learning parameter determined by the training or learning process.

According to various embodiments, the input unit 930 may receive various data for the deep learning of the collision safety model 120 under the control of the processor 910. For example, the input unit 930 may receive the output data 130 and/or the input data 110 for the first supervised learning and/or the second supervised learning of the collision safety model 120. According to the embodiment, the input unit 930 may include a communication device (e.g., a transceiver) capable of obtaining the input data 110 and/or the output data 130 through wired/wireless communication.

According to various embodiments, the output unit 940 may output various data generated during the deep learning process of the collision safety model 120 under the control of the processor 910.

According to various embodiments, the processor 910 may perform data processing and/or operations for the overall operations of the electronic device 900. The processor 910 may control at least one other component included in the electronic device 900 by executing a software program. In addition, the processor 910 may perform deep learning-based learning according to the program code stored in the memory 920 and may store a result of the learning in the memory 920. According to the embodiment, the processor 910 includes the collision safety control system 100, thereby operating as described in FIGS. 1 to 8. For example, the processor 910 may perform the first supervised learning and/or the second supervised learning of the collision safety model 120 stored in the memory 920, on the basis of the input data 110 and the output data 130 obtained through the input unit 930.

According to embodiments of the present disclosure, at least one operation performed by the collision safety control system 100 may be performed based on an input of a user (e.g., a business operator, a collision safety manager, etc.). For example, an operation of setting input data and/or output data for the supervised learning of the collision safety model 120 may be performed based on an input of the user.

As described above, the collision safety control system 100 according to various embodiments of the present disclosure performs the supervised learning of the deep learning-based collision safety model by using the pre-collision sensor data and the post-collision sensor data, thereby tuning the deep learning parameter of the collision safety model.

According to various embodiments of the present disclosure, the collision safety control system performs training of the deep learning-based collision safety model by using the pre-collision sensor data and the post-collision sensor data, thereby tuning the parameter of the collision safety model. Accordingly, it is possible to reduce the time required for tuning the parameter compared to a conventional method of manually tuning.

What is claimed is:

1. A collision safety control system, comprising:

a memory configured to store a collision safety model having a deep learning-based collision safety control logic; and a processor electrically connected to the memory, the processor configured to, in accordance with the deep learning-based collision safety control logic, train, based on at least one signal including pre-collision data and post-collision data, the collision safety model such that the collision safety model outputs a collision type and a required time-to-fire (RTTF) or a time-to-fire (TTF) of passenger protection equipment corresponding to the at least one signal, wherein the collision safety model is trained i) by performing first supervised learning based on the RTTF as output data and ii) by performing second supervised learning based on an adjusted RTTF as the output data, wherein the processor is configured to obtain the adjusted RTTF by applying a weight according to a forward collision-avoidance assist (FCA) level included in the pre-collision data to the RTTF corresponding to the collision type, and wherein the collision safety model is provided in a vehicle, and the vehicle is configured to perform automated driving control based on the collision safety model.

2. The collision safety control system of claim 1, wherein the pre-collision data comprises at least one of an advanced driver assistance system (ADAS) signal of the FCA level before an occurrence of a collision, a value of the FCA level before the occurrence of the collision, or a relative approach speed before the occurrence of the collision.

3. The collision safety control system of claim 1, wherein the post-collision data comprises a time series speed or a time series acceleration obtained by a plurality of collision detection sensors after an occurrence of a collision.

4. The collision safety control system of claim 3, wherein the processor is configured to:

specify the post-collision data as an input data of the collision safety model, specify the collision type and the RTTF as the output data of the collision safety model, and obtain a deep learning parameter of the collision safety model by performing the first supervised learning of the collision safety model based on the input data and the output data, wherein the post-collision data includes a first post-collision data obtained through an analysis and/or an actual vehicle test of each of one or more collision types defined in at least one of laws, merchantability, or sensing test items of a target vehicle, and wherein the collision type and the RTTF are defined in at least one of the laws, the merchantability, or the sensing test items of the target vehicle.

5. The collision safety control system of claim 4, wherein the processor is configured to determine, based on the collision safety model to which the deep learning parameter has been applied, a collision type and a required time-to-fire of a second post-collision data obtained through an analysis of vehicle-to-vehicle collision.

6. The collision safety control system of claim 5, wherein the processor is configured to:

specify a set of the pre-collision data and the post-collision data as the input data of the collision safety model to which the deep learning parameter has been applied, specify the collision type and the adjusted RTTF as the output data of the collision safety model, and update the deep learning parameter of the collision safety model by performing the second supervised learning of the collision safety model based on the input data and the output data, wherein the post-collision data included in the set of the pre-collision data and the post-collision data is the first post-collision data or the second post-collision data, wherein the collision type corresponds to the first post-collision data or the second post-collision data, and wherein the adjusted RTTF is obtained by adjusting the RTTF corresponding to the collision type based on the pre-collision data.

7. The collision safety control system of claim 6, wherein the processor is configured to, using the collision safety model to which the updated deep learning parameter has been applied, output a collision type and a required time-to-fire of a random collision signal.

8. A method of operation of a collision safety control system, the method comprising:

obtaining at least one signal including pre-collision data and post-collision data; and training a collision safety model having a deep learning-based collision safety control logic such that the collision safety model outputs a collision type and a required time-to-fire (RTTF) or a time-to-fire (TTF) of passenger protection equipment corresponding to the at least one signal, wherein the collision safety model is trained i) by performing first supervised learning based on the RTTF as output data and ii) by performing second supervised learning based on an adjusted RTTF as the output data, wherein the method includes obtaining the adjusted RTTF by applying a weight according to a forward collision-avoidance assist (FCA) level included in the pre-collision data to the RTTF corresponding to the collision type, and wherein the collision safety model is provided in a vehicle, and the method further in includes performing automated driving control of the vehicle based on the collision safety model.

9. The method of claim 8, wherein the pre-collision data comprises at least one of an advanced driver assistance system (ADAS) signal of the FCA level before an occurrence of a collision, a value of the FCA level before the occurrence of a collision, or a relative approach speed before the occurrence of a collision.

10. The method of claim 8, wherein the post-collision data comprises a time series speed or a time series acceleration which is obtained by a plurality of collision detection sensors after an occurrence of a collision.

11. The method of claim 10, wherein training the collision safety model comprises:

specifying the post-collision data as an input data of the collision safety model, specifying the collision type and the RTTF as the output data of the collision safety model, and obtaining a deep learning parameter of the collision safety model by performing the first supervised learning of the collision safety model based on the input data and the output data, wherein the post-collision data includes a first post-collision data which is obtained through an analysis and/or an actual vehicle test of each of a plurality of collision types defined in at least one of laws, merchantability, or sensing test items of a target vehicle, and wherein the collision type and the RTTF are defined in at least one of the laws, the merchantability, or the sensing test items of the target vehicle.

12. The method of claim 11, wherein training the collision safety model further comprises determining, using the collision safety model to which the deep learning parameter has been applied, a collision type and a required time-to-fire of a second post-collision data obtained through an analysis of vehicle-to-vehicle collision.

13. The method of claim 12, wherein training the collision safety model further comprises:

specifying a set of the pre-collision data and the post-collision data as the input data of the collision safety model to which the deep learning parameter has been applied, specifying the collision type and the adjusted RTTF as the output data of the collision safety model, and updating the deep learning parameter of the collision safety model by performing the second supervised learning of the collision safety model based on the input data and the output data, wherein the post-collision data included in the set of the pre-collision data and the post-collision data comprises at least one of the first post-collision data or the second post-collision data, wherein the collision type corresponds to the first post-collision data or the second post-collision data, and wherein the adjusted RTTF is obtained by adjusting the RTTF corresponding to the collision type based on the pre-collision data.

14. The method of claim 13, further comprising outputting, using the collision safety model to which the updated deep learning parameter has been applied, a collision type and a required time-to-fire of a random collision signal.

15. A non-transitory computer-readable storage medium having a program recorded thereon, the program, when executed by a processor, causes the processor to:

obtain at least one signal including pre-collision data and post-collision data; and train a collision safety model for a vehicle, the collision safety model having a deep learning-based collision safety control logic such that the collision safety model outputs a collision type and a required time-to-fire (RTTF) or a time-to-fire (TTF) of passenger protection equipment which correspond to the at least one signal, wherein the collision safety model is trained i) by performing first supervised learning based on the RTTF as output data and ii) by performing second supervised learning based on an adjusted RTTF as the output data, wherein the adjusted RTTF is obtained by applying a weight according to a forward collision-avoidance assist (FCA) level included in the pre-collision data to the RTTF corresponding to the collision type; and perform automated driving control of the vehicle based on the collision safety model.

* * * * *